United States Patent [19]
Friedmann et al.

[11] Patent Number: 5,788,004
[45] Date of Patent: Aug. 4, 1998

[54] POWER CONTROL SYSTEM FOR MOTOR VEHICLES WITH A PLURALITY OF POWER-CONVERTING COMPONENTS

[75] Inventors: Siegfried Friedmann, Massenhausen; Karl Brinz, München; Michael Preis, Koenigsbrunn; Georg Goetz, Steinkirchen; Jürgen Krause, München, all of Germany

[73] Assignee: Bayerische Motoren Werke Aktiengesellschaft, Germany

[21] Appl. No.: 598,853

[22] Filed: Feb. 9, 1996

[30] Foreign Application Priority Data

Feb. 17, 1995 [DE] Germany ............... 195 05 431.8

[51] Int. Cl.⁶ .................................................. B60K 1/00
[52] U.S. Cl. ....................... 180/65.2; 180/65.4; 318/143
[58] Field of Search .................... 180/65.1, 65.2, 180/65.3, 65.4; 314/139, 143, 150, 161, 254; 363/15; 364/426.01, 426.041, 426.043, 431.03, 431.02, 431.01

[56] References Cited

U.S. PATENT DOCUMENTS

| | | | |
|---|---|---|---|
| 4,407,132 | 10/1983 | Kawakatsu et al. | 180/65.4 |
| 4,953,646 | 9/1990 | Kim | 180/65.4 |
| 5,214,358 | 5/1993 | Marshall | 180/65.4 |
| 5,346,031 | 9/1994 | Gardner | 180/65.4 |
| 5,402,046 | 3/1995 | Jeanneret | 180/65.4 |

FOREIGN PATENT DOCUMENTS

| | | |
|---|---|---|
| 24 06 222 | 8/1975 | Germany. |
| 32 33 193 | 3/1983 | Germany. |
| 41 09 379 | 10/1991 | Germany. |
| 41 33 013 | 4/1993 | Germany. |
| 42 05 770 | 8/1993 | Germany. |
| 43 41 817 | 6/1994 | Germany. |
| 43 44 053 | 7/1994 | Germany. |

*Primary Examiner*—Richard M. Camby
*Attorney, Agent, or Firm*—Evenson, McKeown, Edwards & Lenahan, P.L.L.C.

[57] ABSTRACT

In a power control system for motor vehicles with a plurality of power-converting elements as well as sensors for determining the efficiency of the individual elements, a processor determines the overall system efficiency from the efficiencies of the individual components, and calculates and adjusts a value for a parameter that influences the efficiency of at least one component to achieve an optimum total efficiency. Surplus power is used to charge an energy storage device. Preferably the parameters that influence the efficiency, whose values are adjusted to achieve an optimum total efficiency, are the power, or a parameter that is proportional to the power, that is to be delivered by a power-generating component, and/or the rpm or a parameter that is proportional to the rpm of a component.

17 Claims, 3 Drawing Sheets

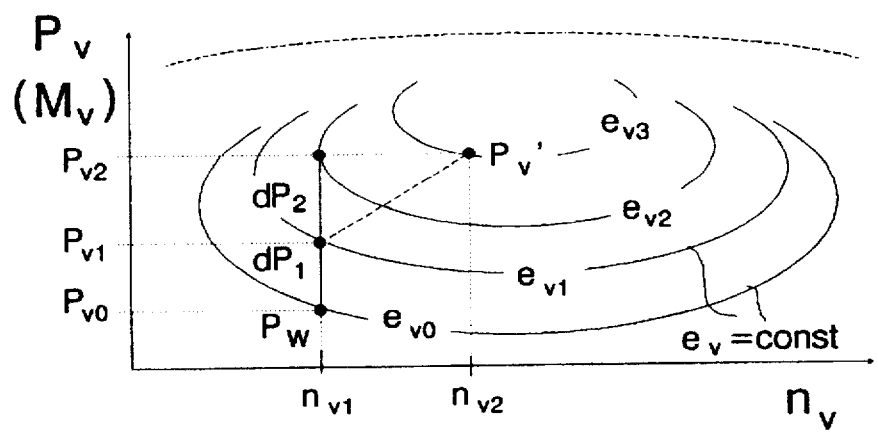
FIG. 1
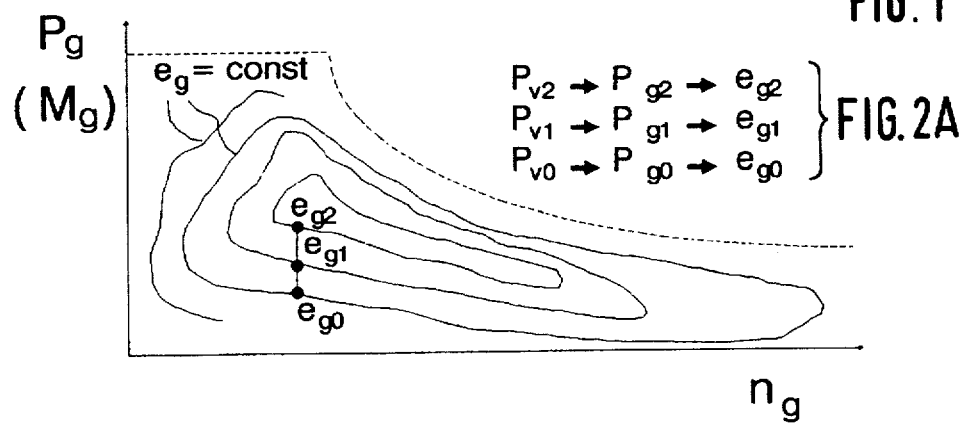
FIG. 2A
FIG. 2B
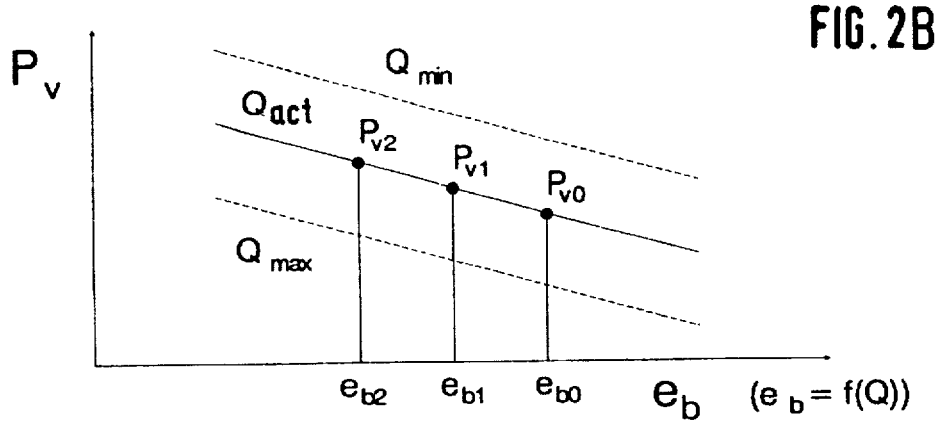
FIG. 3
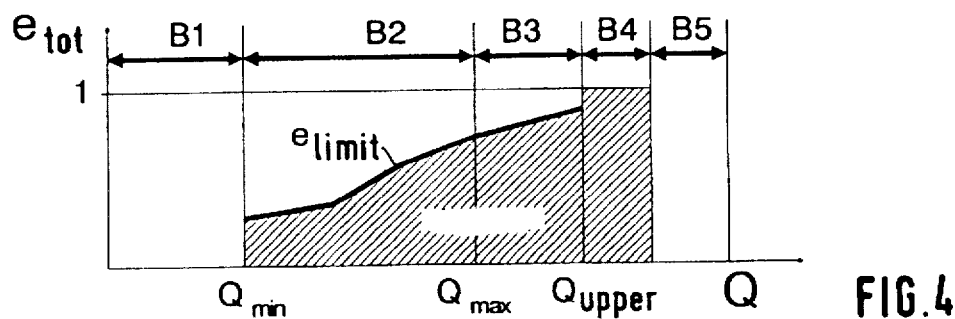
FIG. 4

POWER CONTROL SYSTEM FOR MOTOR VEHICLES WITH A PLURALITY OF POWER-CONVERTING COMPONENTS

BACKGROUND AND SUMMARY OF THE INVENTION

The invention relates to a power control system for motor vehicles with a plurality of power-converting components.

A power control system of this generic type is disclosed, for example, in German Patent Document DE 41 33 013 A1. It is intended for use in a motor vehicle that contains a drive unit consisting of an internal combustion engine and a generator, which delivers current through an energy distributor power electronic system to electric motors coupled to drive wheels. In this known power control system, the internal combustion engine is a power-converting unit which provides the primary power-generating component. Additional power-converting elements include for example the generator, the electric motor, and the energy storage device. In addition, means are available for determining and taking into account the efficiency of the individual elements, especially the energy storage device, the internal combustion engine, and the generator. The power delivered by the internal combustion engine in particular is controlled as a function of various parameters and limiting conditions, especially fuel consumption and the efficiency of the engine.

In this type of power control, the primary goal is to produce a drive power that accords with the driver's wishes, by means of optimum distribution of the power delivered by the power-converting elements for the drive. Although this power distribution is based on various parameters and limiting conditions including "fuel consumption" or "favorable efficiency" of the engine, the efficiencies of the other components are disregarded. Moreover, no fuel consumption optimization takes place at all.

An object of the present invention is to provides a power control system of the type mentioned above, in which the consumption of the primary energy source (fuel for example) is minimized to the greatest extent possible in every operating state.

This and other objects and advantages are achieved by the power control system according to the invention in which means are provided for determining overall system efficiency based on the efficiencies of the individual elements of the power system, as well as means for calculating and adjusting at least one efficiency-influencing parameter of one such element, to achieve optimum total efficiency.

In a driving arrangement of a motor vehicle power-converting elements include, for example, an internal engine, a generator, an electric motor, a transmission (e.g., stepped transmission, continuous velocity transmission) and an electrical energy storage device (e.g., battery, gyro, or "Supercap") . Parameters that influence the efficiency of these elements include, for example, the rpm (or a parameter proportional thereto) and the power (or a parameter proportional thereto, such as torque) as well as adjusting means which influence them, such as the gear ratio (stepped transmission, continuous velocity transmission); the amount of charge and/or battery conditions relating to design; and the temperatures of the components. Preferably, characteristic maps or look up tables are provided for each element, which show the efficiency as a function of the parameters in question.

Optimum total efficiency may be defined, for example, as the maximum possible total efficiency, or it may be a total efficiency that is above a specified threshold level in conjunction with one or more additional conditions.

Preferably, the calculation of the value of a parameter that influences the efficiency of an element of the system is performed iteratively to achieve an optimum total efficiency.

In one embodiment of the invention, the power to be delivered by a power generating component (or a parameter that is proportional to the power to be delivered by such a component; for example, the torque or momentum) is used as an efficiency-influencing parameter and is adjusted to achieve optimum total efficiency. (This parameter will be referred to herein simply as power.) For this purpose, for example, the total efficiency of all components is calculated for a power level selected by the driver, and for other higher power values, and the power output is then adjusted to a level which achieves optimum, preferably maximum, total efficiency. A power level which exceeds the driver's wish for reaching the optimum total efficiency, however, is preferably delivered only when such a power surplus can be utilized advantageously. By suitable adjustment of the power (or the corresponding torque), an optimum energy balance can be achieved for the entire drive system.

In another embodiment of the invention, the rpm of a component (or a parameter proportional to the rpm, referred to herein only as rpm) is adjusted to achieve optimum total efficiency. This improvement according to the invention is especially advantageous in drive systems with continuous variable transmissions. Particularly in conjunction with the embodiment described in the preceding paragraph, this improvement achieves an optimization of the total efficiency with particular flexibility.

In yet another embodiment of the invention, an electrical energy storage device is provided as a power-converting element. The power to be delivered by a power-generating element is composed of a power component determined by the driver, and an additional power component which is used to charge the electrical energy storage device. Thus, not only is the consumption of the primary energy source (for example, the fuel consumption) minimized, but an additional advantage is also achieved.

In still another advantageous embodiment, charging of the electrical energy storage device by means of this additional power component instead of a higher power (required for faster charging for example) is allowed only if the existing charge level in the electrical storage device is at least as great as a predetermined limiting charge level. This arrangement thus prevents adverse consequences such as deep discharging of a battery, because of the measures that minimize the consumption of primary energy.

According to a further feature of the invention, charging of the electrical energy storage device by means of the additional power component is permitted only when the total efficiency is at least equal to a predetermined threshold efficiency level. Preferably, the threshold is defined as a function of the instantaneous charge state of the energy storage device. In this manner, battery related limiting conditions such as the charge-dependent efficiency of energy storage and discharge are taken into account.

The power control system according to the present invention is especially advantageous in serial or parallel hybrid drives for motor vehicles, which must deal with the dual concerns of minimizing fuel consumption and, especially in the case a high power demand from the driver, of supplying sufficient electrical energy. Especially when using the power control system according to the invention in hybrid vehicles, the total energy flow (from energy generation through energy intermediate storage to energy dispensation for propulsion) is taken into account, preferably during the determination of the total efficiency of the components. In general, overall efficiency optimization according to the invention minimizes the primary energy that is consumed by a power-generating component as a power-converting component.

Other objects, advantages and novel features of the present invention will become apparent from the following detailed description of the invention when considered in conjunction with the accompanying drawings.

BRIEF DESCRIPTION OF THE DRAWINGS

FIG. 1 shows curves of equal efficiency for an internal combustion engine as a power-generating component, as a function of its rpm and power (or torque);

FIG. 2A shows how to determine the efficiency of the generator in correspondence to the respective engine output power levels;

FIG. 2B show the curves of equal efficiency for a generator as an additional power-converting component, as a function of its rpm and power;

FIG. 3 shows curves representing the efficiency of an electrical energy storage device as a function of the energy delivered by the internal combustion engine and the charge state of the electrical energy storage device;

FIG. 4 shows different charging strategies for an electrical energy storage device as a function of the total efficiency and the instantaneous charge state;

DETAILED DESCRIPTION OF THE DRAWINGS

Figure 5:
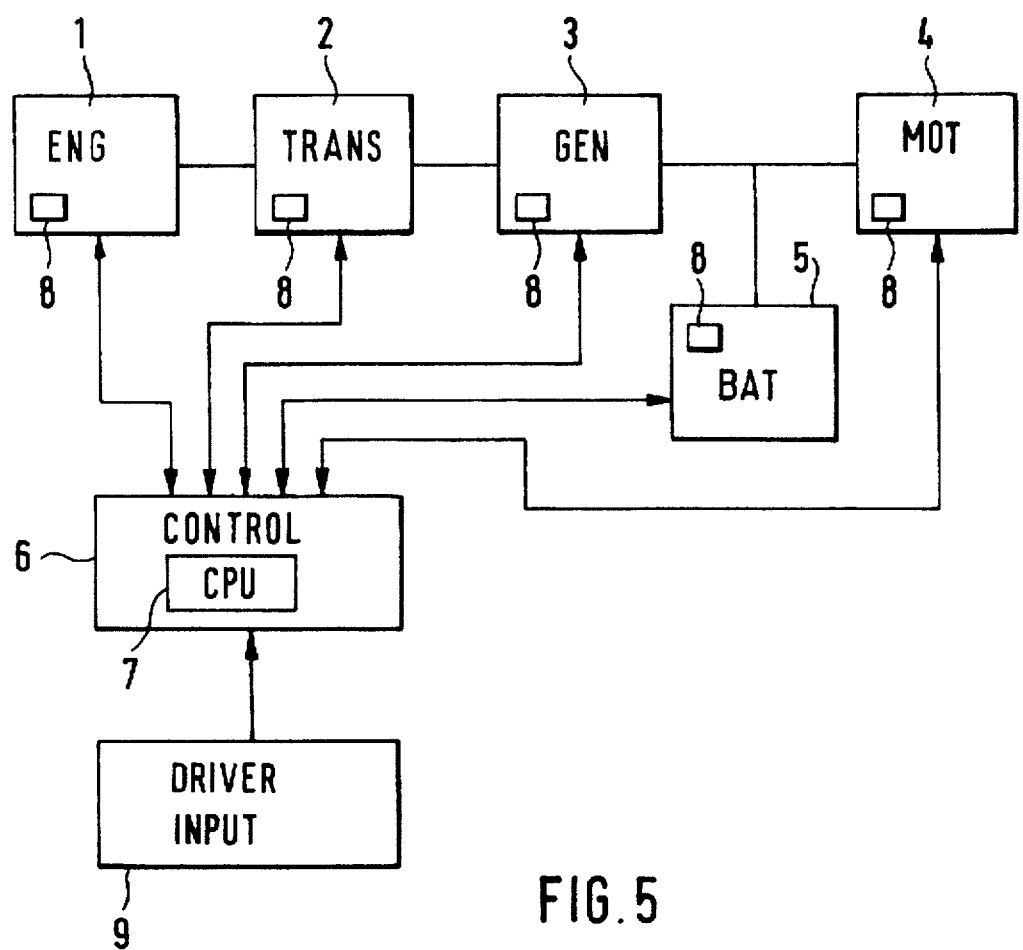
FIG. 5 shows a configuration of a serial hybrid system which could be also of a parallel type.

In FIG. 1, the rpm $n_V$ of the internal combustion engine is plotted on the abscissa and its torque $M_V$ or power $P_V$ is plotted on the ordinate. (The torque $M_V$ is a value that is proportional to the power $P_V$ to be delivered.) Curves of equal efficiency ($e_V$=const) are plotted on the graph.

Usually, sensors are provided in a motor vehicle to detect various operating parameters, for example, the rpm, the driver's speed or acceleration demand, motor torque or power and the charge state of the battery. The driver's speed or acceleration demand, for example, is determined by a signal that indicates the position of the accelerator or the position of the throttle flap actuated by the accelerator. In addition, an electronic control device is usually provided which, when used for example to control the power, controls various actuators as a function of the sensor signals and contains the efficiency curves.

FIG. 1 shows an operating point $P_W$ which represents, at a given first rpm value $n_{V1}$, the power component $P_W$ required by the driver's input. At least this level of power must be delivered, therefore, in order to satisfy the driver's requirement for driving power. This power component $P_W$, at the engine speed $n_{V1}$, results in an internal combustion engine efficiency $e_{V0}$, as can be seen from the curves shown in FIG. 1 (which, for example, may be stored in the form of tables in an electronic control device) . In addition, the associated internal combustion engine efficiency $e_V$ is determined for several values of power $P_V$ ($P_{V1}$, $P_{V2}$) that are larger than the value of the power component ($P_{V0}$=$P_W$) requested by the driver. For example, in the case of an average operating point defined by an rpm value $n_{V1}$ and a power output $P_{V1}$, (composed of the power component $P_W$ that corresponds to the driver's requirement, plus an additional power component $dP_1$), the internal combustion engine efficiency is $e_{V1}$. Similarly, at an upper operating point defined by the rpm value $n_{V1}$ and the power $P_{V2}$, (equal to the driver's requirement $P_W$ plus an even larger surplus equal to $dP_1$+$dP_2$), the internal combustion engine efficiency increases further, to a value of $e_{V2}$.

In an alternative shown by the dashed lines, if it is assumed, for example, that a continuous variable transmission is provided, so that any rpm adjustment is possible, the upper operating point could also be established at the second rpm value $n_{V2}$ and power value $P_V'$=$P_{V2}$. An increase in the rpm value to $n_{V2}$ simultaneously with a power increase to the power value $P_V'$=$P_{V2}$ to achieve this alternative upper operating point would be especially advantageous, since with the same power $P_{V2}$, a higher internal combustion engine efficiency $e_{V3}$ would be achieved. This would be possible if, for example, both the power to be delivered and the rpm were adjustable to control the efficiency. In the following example, solely for the sake of simplicity, however, only the output power will be adjusted in order to control and optimize the overall efficiency.

At a particular engine speed ($n_{V1}$), each of the three internal combustion engine efficiency levels $e_{V0}$, $e_{V1}$, and $e_{V2}$ is associated with a power output $P_{V0}$, $P_{V1}$, and $P_{V2}$ delivered by the internal combustion engine. As noted previously, these power output levels are related to the driver's driving power requirement $P_W$ as follows:

$$P_{V0}=P_W$$

$$P_{V1}=P_W+dP_1$$

$$P_{V2}=P_W+dP_1+dP_2$$

(Of course, instead of the power values $P_V$, torque values $M_V$ could also be used.)

As indicated in FIG. 2A, each of the internal combustion engine power levels $P_{V0}$, $P_{V1}$ and $P_{V2}$ is associated with a power $P_g$ or a torque $M_g$ of the generator connected to the engine. The graph of FIG. 2B, shows curves which represents equal efficiency levels ($e_g$=const) for the generator, as a function of the generator rpm $n_g$ and the generator torque $M_g$ (or power $P_g$.) At a particular generator rpm value $n_g$, depending on the equal power value $P_{V0}$ and the resulting generator power $P_{g0}$, a generator efficiency $e_{g0}$ is achieved. Likewise, at the same generator speed, the other power values $P_{V1}$ and $P_{V2}$ (for the generator power values $P_{g1}$ and $P_{g2}$) achieve generator efficiency values $e_{g1}$ and $e_{g2}$. (It should be noted in addition that, in one alternative for example, the power $P_g$ or the torque $M_g$ the rpm $n_g$ of the generator could be used as adjustable values of parameters that influence the efficiency for optimization of the total efficiency.)

FIG. 3 shows the efficiency $e_b$ of the electrical energy storage device, preferably a battery, for the calculated power values $P_{V0}$, $P_{V1}$, $P_{V2}$ as a function of the charge amount Q. As this graph shows, at a given instantaneous charge level $Q_{actual}$, the three above-mentioned power values $P_{V0}$, $P_{V1}$, $P_{V2}$ result in efficiencies $e_{b0}$, $e_{b1}$, and $e_{b2}$ respectively. In addition, minimum and maximum charge quantities $Q_{min}$ and $Q_{max}$ are plotted as dashed lines. In a first advantageous improvement of the invention, a battery efficiency $e_b$ is calculated only within these two limits $Q_{min}$ and $Q_{max}$. Outside these two limits, for example, a forced charge can be performed.

The overall efficiency of the vehicle propulsion system $e_{total}$ can be calculated as a function of the efficiencies of the three individual components: the internal combustion engine, the generator, and the battery as follows:

$e_{total} = e_{v1} \times e_{gi} \times e_{bb}$ where $i=0, 1, 2$

Thus, for a power value $P_{V1}$ of the internal combustion engine, a total efficiency $e_{total\ 1}$ of $e_{v1} \times e_{g1} \times e_{b1}$ is obtained. Similarly, overall efficiency values $e_{total\ 0}$, $e_{total\ 1}$, and $e_{total\ 2}$ can be calculated for all three output power values $P_{V0}$, $P_{V1}$, and $P_{V2}$. To determine the optimum total efficiency $e_{opt}$, the maximum efficiency is selected. That is, the optimum total efficiency $e_{opt}$=max ($e_{total\ 0}$, $e_{total\ 1}$, $e_{total\ 2}$). Thus, to achieve the maximum or optimum total efficiency $e_{opt}$, the power $P_V$ or the torque $M_V$ must be adjusted by the control device, to a level which corresponds to the power component $P_W$ required by the driver, plus an additional power component $dP_1$.

In addition, another rpm can be set; preferably, however, this adjustment is only made when the resultant total efficiency $e_{total\ 1}$ is greater than a defined lower limiting efficiency $e_{limit}$ as explained in connection with FIG. 4.

FIG. 4 shows the calculated total efficiency $e_{total}$ of an electrical energy storage device plotted on the ordinate and the charge amount Q plotted on the abscissa. Depending on the amount of charge Q of the battery, various areas B1 to B5 are defined within which different charging strategies can be employed. For example, in a first technique the battery is charged in the manner of the power control system according to the invention only in the areas B2, defined by the lower limit $Q_{min}$ and the upper limit $Q_{max}$, and/or B3, defined by the lower limit $Q_{max}$ and the upper limit $Q_{upper}$. According to this approach, a minimum limiting charge amount $Q_{min}$ must be maintained. Thus, if the instantaneous charge Q is below the defined minimum $Q_{min}$ forced charge (that is, independent of efficiency considerations) is in order, for example, to prevent a deep discharge of the electrical energy storage device B1. In area B5, in which the battery is essentially fully charged, a calibrating charge can be made. In addition, it is recommended especially in hybrid vehicles, to use area B5 for a recuperative input of braking energy.

In areas B2 and B3, the procedure followed initially is as follows:

For the various powers, $P_W$, $P_W+dP_1$, and $P_W+dP_1+dP_2$, the total efficiencies $e_{total\ 0}$, $e_{total\ 1}$, and $e_{total\ 2}$ are determined, are compared with the lower efficiency limit $e_{limit}$ which, as shown in FIG. 4, depends on charge quantity Q.

In area B2, the maximum power, max ($P_W$, $P_W+dP_1$, $P_W+dP_1+dP_2$), is determined and adjusted for the total efficiencies $e_{total\ 0}$, $e_{total\ 1}$, and $e_{total\ 2}$, which are above the limiting efficiency $e_{limit}$. Thus, in area B2, in a first embodiment, the optimum total efficiency $e_{opt}$ is defined as a total efficiency which is greater than the lower limit $e_{limit}$, and is obtained with maximum output power (or torque). Correspondingly, in area B3 in a second embodiment, the optimum total efficiency is the largest of the total efficiencies $e_{total\ 0}$, $e_{total\ 1}$, and $e_{total\ 2}$, when the maximum total efficiency is greater than the lower limit $e_{limit}$.

The process according to the invention, as described above, is illustrated in FIG. 6. After the start of the process, in step 601 the engine speed, generator speed, charge quantity of the battery, and accelerator pedal position are determined. The power level required by the vehicle operator for operation of the vehicle is then determined as a function of engine speed and accelerator position as described previously. In step 602 the efficiencies of the internal combustion engine, the generator, and the battery are determined for each of three power levels $P_{V0}$, $P_{V1}$, and $P_{V2}$. As noted previously, $P_{V0}$ corresponds to the power requested by the driver with the engine operating at engine speed $e_{V1}$, while $P_{V1}$ corresponds to the power requested by the driver plus an increment $dP_1$ and $P_{V2}$ corresponds to the level of $P_{V1}$, plus an additional increment $dP_2$. The respective efficiencies in each case are determined from the maps as shown in FIGS. 1, 2B, and 3.

In step 603, the overall efficiency $e_{total}$ of the vehicle propulsion system is calculated for each of the respective power levels $P_{V0}$, $P_{V1}$ and $P_{V2}$ as the product of the associated engine, generator, and battery efficiencies for each. Thereafter, in step 604 a determination is made whether the battery charge level Q is $\geq Q_{max}$ (FIG. 4). If it is not, a further determination is made in step 605 the battery charge level Q lies between the minimum and maximum charge levels $Q_{min}$ and $Q_{max}$ as shown in FIG. 4. If not, and if the charge level is determined in step 606 to be $\leq Q_{min}$, the internal combustion engine is adjusted in step 607 in the manner described previously to provide a maximum power output so as to perform a forced charge, and to prevent a harmful deep discharge of the battery.

Figure 6:
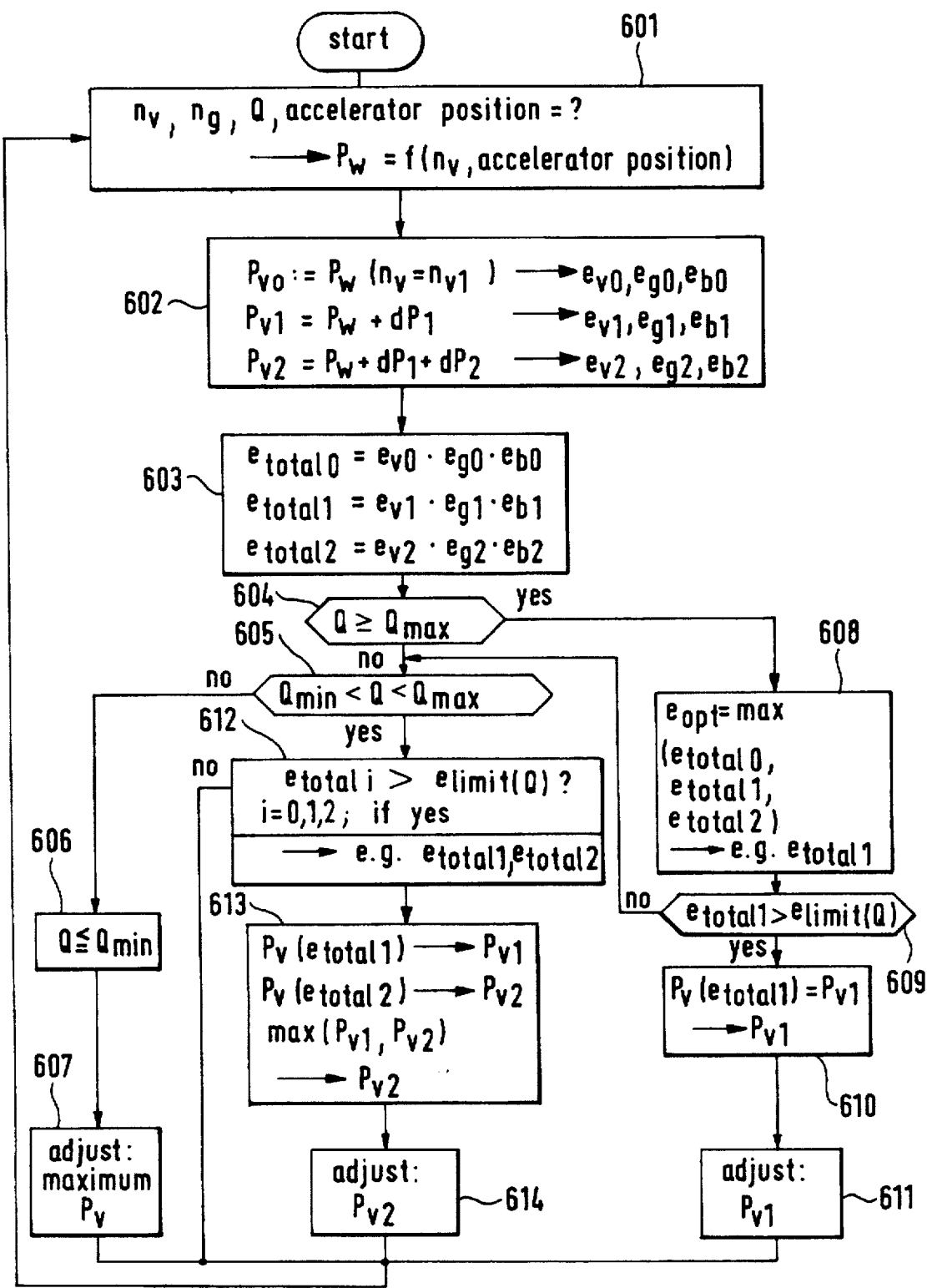
FIG. 6 is a flow chart which illustrates the operation of the power control system according to the invention.

If it is determined in steps 604 that the battery charge level Q is $\geq$ the level $Q_{max}$ (FIG. 4), the optimum energy level $e_{opt}$ is determined in step 608 as the maximum of the three previously calculated efficiency levels $e_{total\ 0}$, $e_{total\ 1}$, and $e_{total\ 2}$. In the example of FIG. 6, it is determined that $e_{total\ 1}$ is the largest. Thereafter, in step 609, a further determination is made as to whether the optimum efficiency level $e_{opt}$ thus determined (in this example $e_{total\ 1}$) is >the lower limit $e_{limit}$ (Q) as depicted in FIG. 4. If it is, then the corresponding power level $P_V$ is selected in step 610 (in this case $P_{V1}$) and the engine is adjusted to the power level $P_{V1}$ in step 611, by adjusting either the engine speed or torque in the manner described previously. If, however, it is determined in step 609 that the optimum efficiency $e_{opt}$ (in the example of FIG. 6, $e_{total\ 1}$) is not > the lower limit $e_{limit}$ (Q) as shown in FIG. 4 (that is, it lies below the heavy black line in the hatched area of FIG. 4), then processing returns to step 605.

If it is determined in step 605 that the battery charge level Q lies between the minimum and maximum values $Q_{min}$ and $Q_{max}$, then in step 612 a determination is made as to which of the total efficiency values previously calculated ($e_{total\ 0}$, $e_{total\ 1}$, and $e_{total\ 2}$ are above the lower limit $e_{limit}$ (Q) of FIG. 4. In the example of FIG. 6, it is assumed that the efficiency levels $e_{total\ 1}$ and $e_{total\ 2}$ satisfy this test. Accordingly, in step 613, the power levels $P_{V1}$ and $P_{V2}$ associated with $e_{total\ 1}$ and $e_{total\ 2}$, respectively, are compared and the maximum of these two is selected. In the example of FIG. 6, it is assumed that $P_{V2}$ is greater. Thus, in step 614 the engine is adjusted to the power level $P_{V2}$ in the manner previously described. Thereafter, processing returns to step 601, and the process is repeated.

It has also been found that the efficiency of the individual components can be determined as a function of any number of parameters, such as temperature, that influence the efficiency. For example, the values use for the defined limiting charge amounts $Q_{min}$, $Q_{max}$, or $Q_{upper}$ and/or the efficiency lower limit $e_{limit}$ can be adjusted as a function of additional parameters; such as in a driver-adaptive manner. Driver adaptation is especially advantageous in hybrid vehicles in which an operating mode "electric motor only" or "internal combustion engine plus electric motor" can be selected manually or automatically. For manual selection, for example, a selector switch to be operated by the driver is provided. For automatic selection, various operating elements actuated by the driver are evaluated (such as the accelerator, throttle flap, brake, and clutch) in order to determine the type of driver. When a type of driver is determined that especially frequently requires the electrical power alone or as additional power, the adaptively displaceable limiting values (e.g. $Q_{min}$, $Q_{max}$, $e_{limit}$) are appropriately adjusted in order to maintain the required charge state of the electrical energy storage device.

FIG. 5 is a schematic diagram which illustrates an embodiment of the control system according to the invention, in propulsion arrangement for a motor vehicle. In such propulsion systems, an internal combustion engine 1 drives a generator 3 by means of a transmission unit 2. The generator 3 in turn generates electrical power which may be used selectively to drive the electric motor 4 and to charge the battery 5. A plurality of sensors 8 are provided on each of these propulsion system elements which sense various operating parameters thereof and provide corresponding signals to a control unit 6. A central processing unit 7 contained in the control unit processes the input signals from respective sensors 8 as well as the driver input for required driving power 9, determining the operating efficiency of each element of the system as well as the overall system efficiency for a variety of parameters, and selects an operating point which achieves an optimum overall efficiency as described hereinabove. control unit then adjusts the operating parameters of the various system elements to the selected operating point, and controls both the operation of the motor 4 and the charging of the battery 5. It will of course be appreciated by those skilled in the art that the schematically illustrated system of FIG. 5 may conventionally be implemented in various ways. Data signals may be, for example, in digital or analog form. Moreover, data transmission may be achieved by separate connections as shown, or preferably by means of a data bus, in a manner well known to those skilled in the art.

The power control system for motor vehicles according to the invention can minimize the primary energy consumption of a power-generating component as a function of any operating state, thus ensuring sufficient energy storage in a power-storing component. Both a power-storing component and a power-generating component are examples here of power-converting components.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. Power control system for a motor vehicle having a power system with a plurality of power converting elements, comprising:
   means for determining an operating efficiency for each of said power converting elements;
   means for determining an overall operating efficiency for said power system as a function of determined operating efficiencies of said power converting elements;
   means responsive to said determined, overall operating efficiency based on determined operating efficiencies of the power converting units, for calculating a value of at least one operating parameter for at least one of said power converting elements to achieve an optimum overall operating efficiency of said power system; and
   means for iteratively adjusting said at least one operating parameter to said value which continuously achieves an optimum overall operating efficiency.

2. Power control system according to claim 1 wherein said means for calculating a value of at least one operating parameter to achieve an optimum overall operating efficiency comprises:
   means for calculating said overall operating efficiency for a plurality of values of said at least one operating parameter; and
   means for selecting a value of said at least one operating parameter which achieves a highest value of said overall operating efficiency.

3. Power control system according to claim 2 wherein said at least one operating parameter comprises at least one of output power and operating speed of one of said power converting elements of said power system.

4. Power control system according to claim 3 wherein said at least one operating parameter comprises output power and operating speed of one of said power converting elements of said power system.

5. Power control system according to claim 3 further comprising:
   means for inputting a signal indicative of a required operating power determined by a driver of said motor vehicle; and
   control means, operative when said output power exceeds said required operating power, for storing an excess portion of said output power in an energy storage device.

6. Power control system according to claim 5 wherein:
   said power converting elements comprise at least a combustion engine, an electric generator driven by said engine, an electric motor and a traction battery; and
   said control means causes a first portion of electric power generated by said generator, which portion corresponds to said required operating power, to drive said electric motor, and a remaining portion of said electric power to charge said battery.

7. Power control system according to claim 1 wherein said operating parameter is power, or a parameter proportional to the power, delivered by a power-generating element of said power system.

8. Power control system according to claim 1 wherein said operating parameter is a parameter proportional to rpm of an element of said power system.

9. Power control system according to claim 7 wherein:
   said plurality of power converting elements comprises at least an electrical energy storage device;
   output power or a parameter proportional to power generated by one of said power converting elements is composed of a power component that corresponds to a driving power requirement determined by a driver of said vehicle and an additional power component; and
   the additional power component is used to charge an electrical energy storage device.

10. Power control system according to claim 9 wherein charging of the electrical energy storage device by means of the additional power component, instead of a higher power, is allowed only when a momentary charge amount is available in the electrical energy storage device which is at least as large as a defined limiting charge amount.

11. Power control system according to claim 9 wherein charging of the electrical energy storage device by means of the additional power component is allowed only when total efficiency is at least as large as a defined limiting efficiency.

12. Method of controlling a motor vehicle power system having a plurality of power converting elements, said method comprising the steps of:
   determining an operating efficiency for each of said power converting elements;

determining an overall operating efficiency for said power system as a function of determined operating efficiencies of said power converting elements;

calculating a value of at least an operating parameter for at least one of said power converting elements to achieve an optimum overall operating efficiency of said power system; and iteratively adjusting said at least one operating parameter to said value which achieves an optimum overall operating efficiency.

13. Method according to claim 12 wherein said step of calculating a value of at least one operating parameter to achieve an optimum overall operating efficiency comprises:

calculating said overall operating efficiency for a plurality of values of said at least one operating parameter; and selecting a value of said at least one operating parameter which achieves a highest value of said overall operating efficiency.

14. Method according to claim 13 wherein said at least one operating parameter comprises at least one of output power and operating speed of one of said power converting elements of said power system.

15. Method according to claim 13 wherein said at least one operating parameter comprises output power and operating speed of one of said power converting elements of said power system.

16. Method according to claim 14 further comprising the steps of:

inputting a signal indicative of a required operating power determined by a driver of said motor vehicle; and when said output power exceeds said required operating power, storing an excess portion of said output power in an energy storage device.

17. Method according to claim 16 wherein:

said power converting elements comprise at least a combustion engine, an electric generator driven by said engine, an electric motor and a traction battery; and said storing step comprises causing a first portion of electric power generated by said generator, which portion corresponds to said required operating power, to drive said electric motor, and a remaining portion of said electric power to charge said battery.

* * * * *